(Model.)
4 Sheets—Sheet 2.
P. LARSSON.
ROTARY STEAM ENGINE.
No. 267,230.                       Patented Nov. 7, 1882.
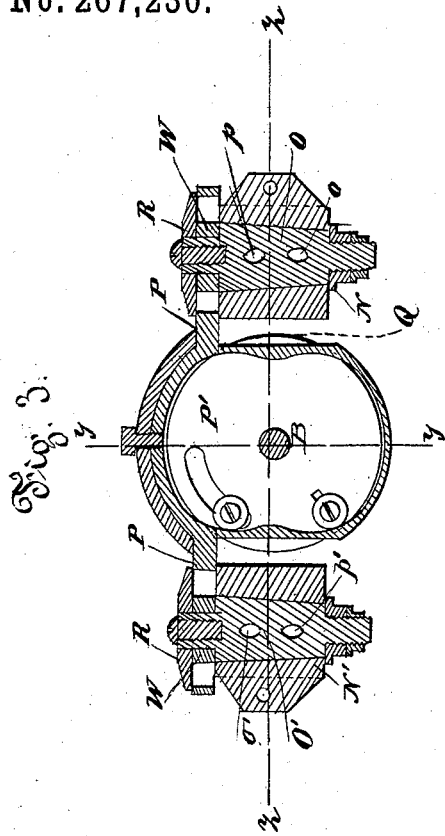
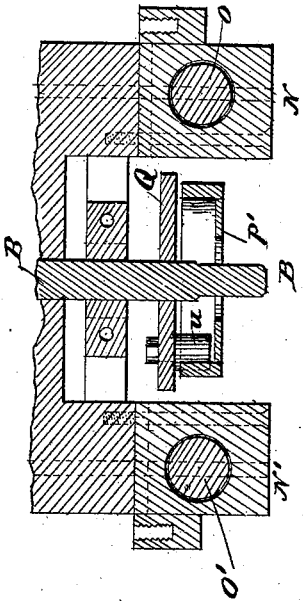
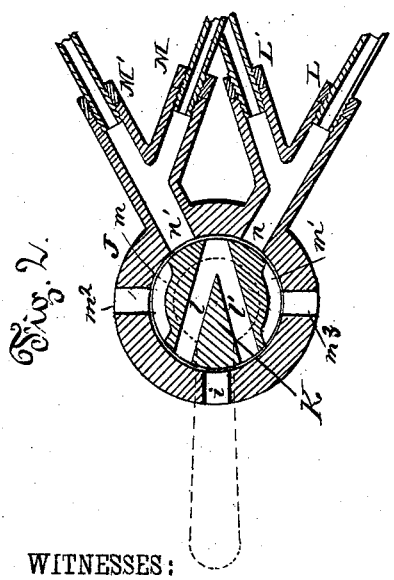
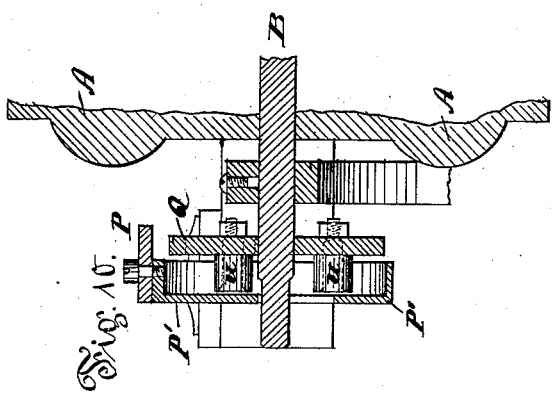
WITNESSES:
Fred. G. Dieterich
Jno. A. Madigan
Pehr Larsson
INVENTOR.
by Louis Bagger & Co.
ATTORNEYS.

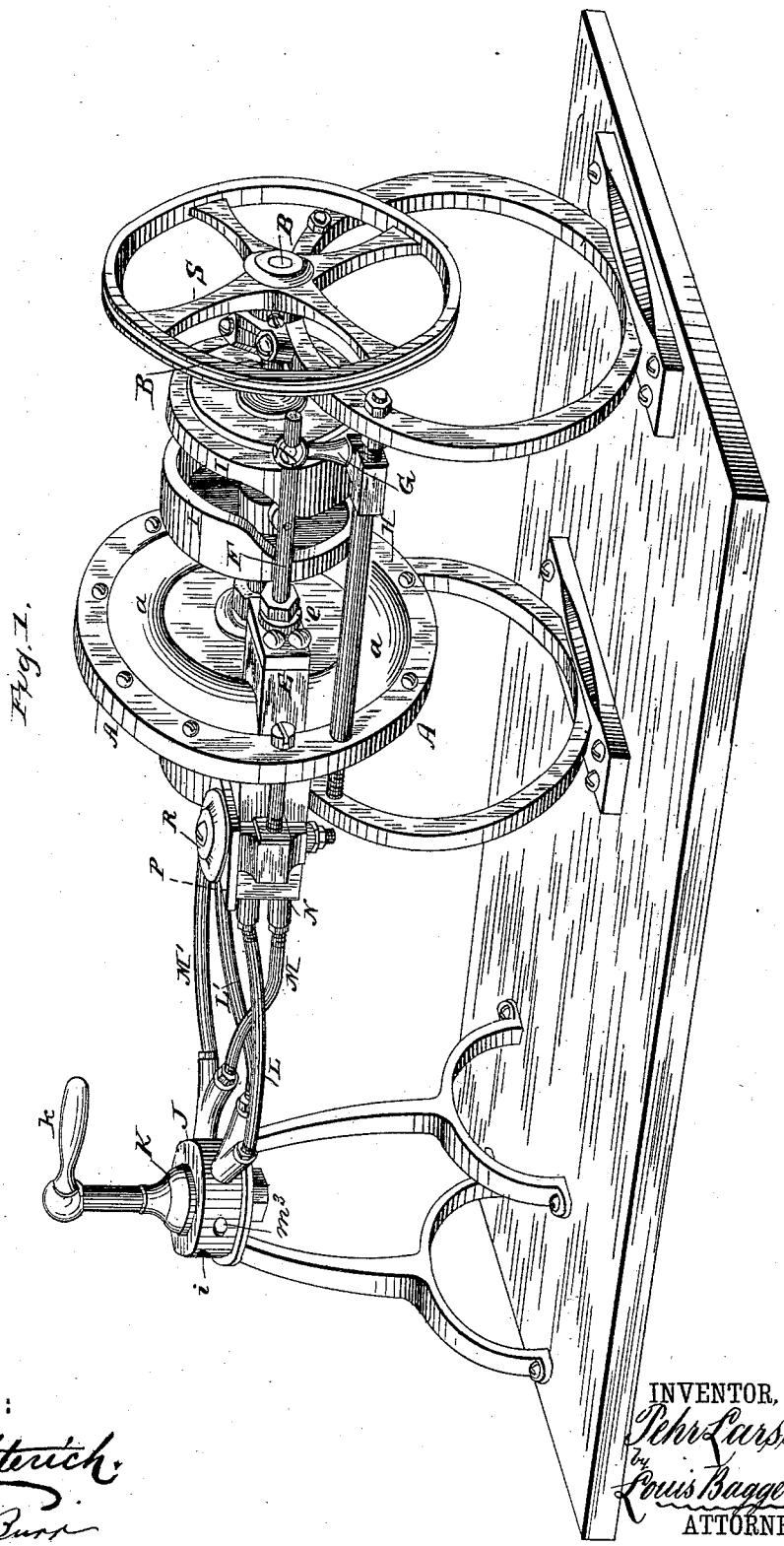

(Model.)
P. LARSSON.
ROTARY STEAM ENGINE.
No. 267,230. Patented Nov. 7, 1882.
4 Sheets—Sheet 3.
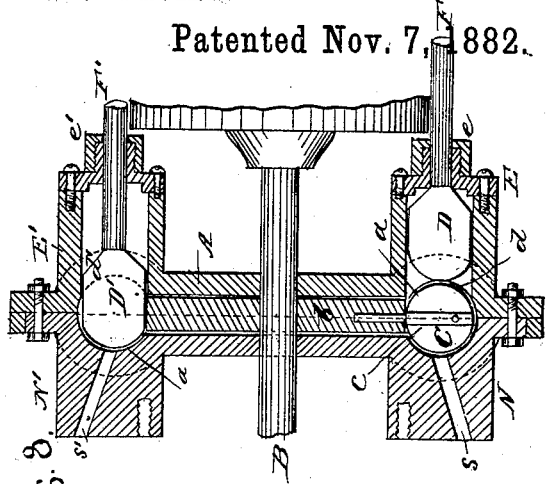
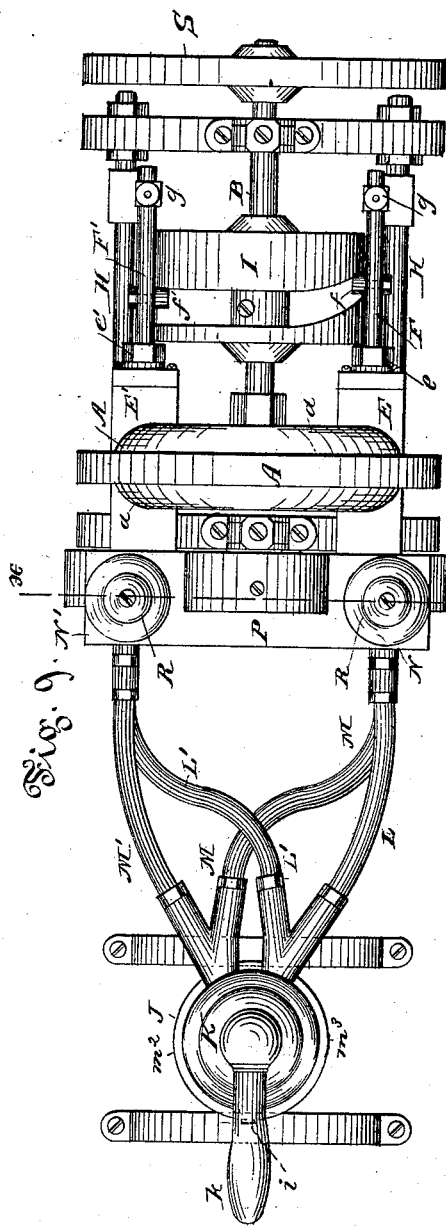
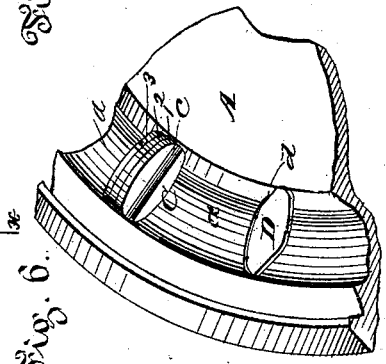
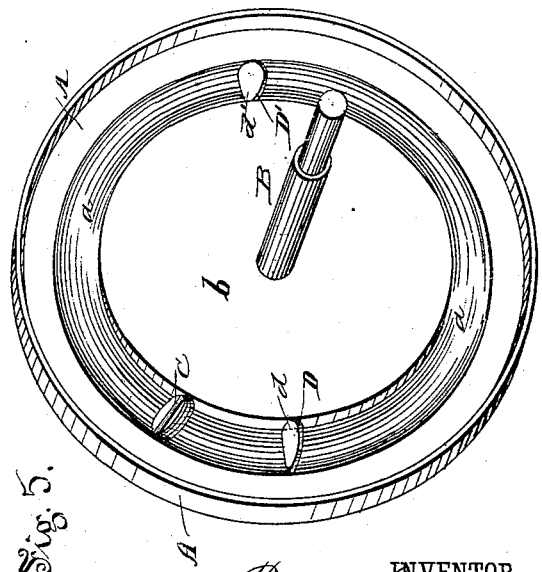
WITNESSES:
Fred. G. Dieterich
Jno. A. Madigan
INVENTOR.
Pehr Larsson
by Louis Bagger & Co.
ATTORNEYS.

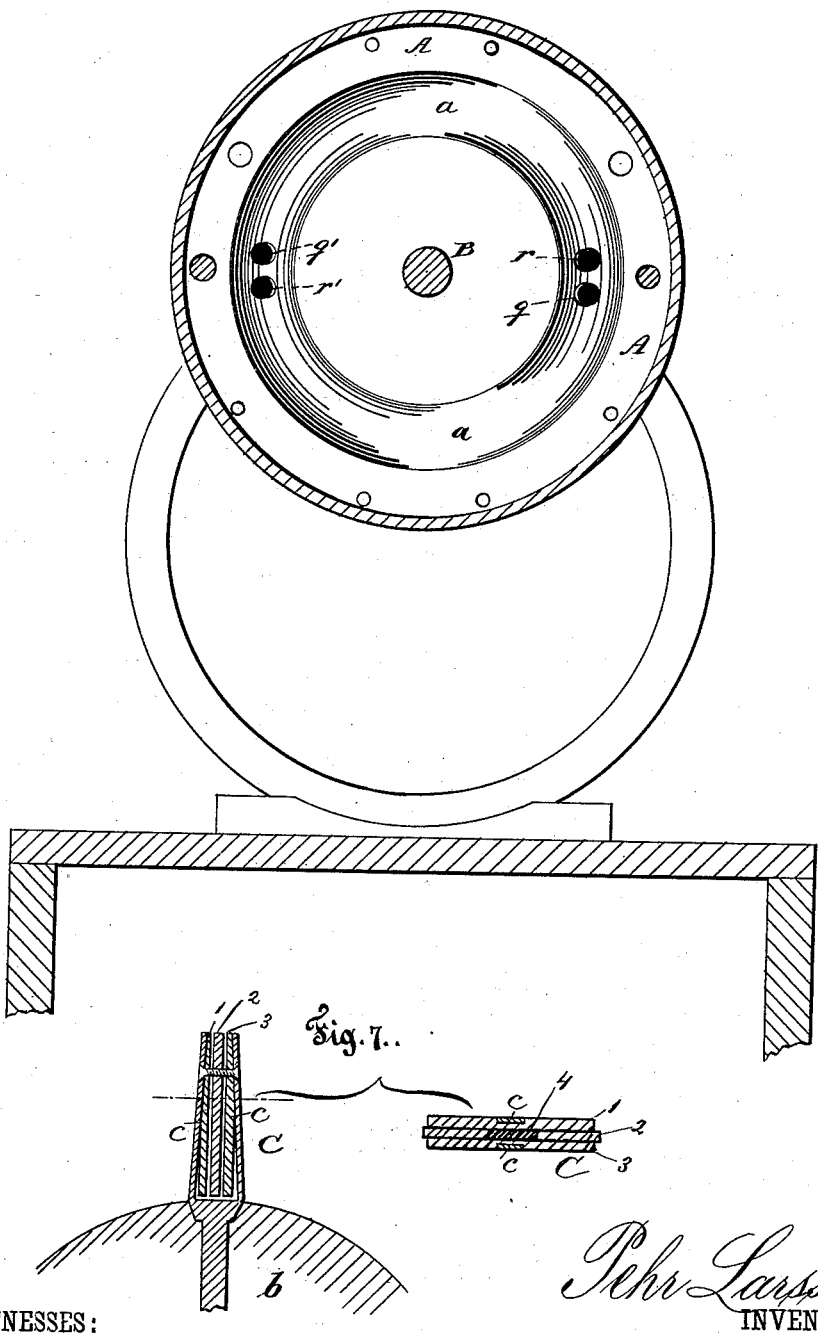

UNITED STATES PATENT OFFICE.

PEHR LARSSON, OF WESTBY, WISCONSIN.

ROTARY STEAM-ENGINE.

SPECIFICATION forming part of Letters Patent No. 267,230, dated November 7, 1882.

Application filed June 17, 1882. (Model.)

*To all whom it may concern:*

Be it known that I, PEHR LARSSON, of Westby, in the county of Vernon and State of Wisconsin, have invented certain new and useful Improvements in Rotary Steam-Engines; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved rotary engine. Fig. 2 is a horizontal section through the main valve for setting the engine in motion, stopping or reversing it. Fig. 3 is a vertical section through the cylinder valve-chests and valves, on line $xx$, Fig. 9. Fig. 4 is a horizontal section through the same on line $zz$, Fig. 3. Fig. 5 is a perspective view of the interior of the steam-cylinder, the face-plate having been removed. Figs. 6 and 7 are detail views of the circular piston. Fig. 8 is a diametrical section through the steam-cylinder with its slides and slide-boxes. Fig. 9 is a plan or top view of the complete engine. Fig. 10 is a vertical section through the slide which operates the valves, on line $yy$, Fig. 3, with its cam and disk; and Fig. 11 is a face view of the inside of the steam-cylinder, showing the steam-ports.

Similar letters of reference indicate corresponding parts in all the figures.

My invention has relation to rotary steam-engines of that class in which a single piston rotates within an annular chamber in the steam-cylinder; and it consists in the improvements hereinafter more fully described, and particularly pointed out in the claims.

In the accompanying drawings, A represents the cylinder, which has an annular steam-chamber, $a$.

B is the axle or drive-shaft, upon which, inside of the cylinder, is fastened the hub or disk $b$, from one side of which projects an arm, $c$, holding the self-packing piston C. The construction of the latter will be readily understood by reference to Figs. 6 and 7, from which it will be seen that it is composed of three (or more) circular disks, 1, 2, and 3, the middle one of which is made in two parts or halves, between which a spring, 4, is placed, which operates to force the two parts of the disk out against the sides of the annular steam-chamber $a$, thus forming a steam-tight packing or self-packing piston. Chamber $a$ has two slots or narrow openings, $d$ and $d'$, arranged diametrically opposite to each other, in which work the slides or cut-offs shown at D and D'.

E and E' are the slide-boxes, which are affixed to the back part of cylinder A, and have stuffing-boxes $e$ $e'$, through which the slide-rods or cut-off rods F and F' work, their outer ends being guided by boxes $g$ in the upper ends of stanchions G, secured upon brace-rods H, one on each side of the central drive-shaft. A reciprocating motion is imparted alternately to the cut-off rods F and F' by a cam, I, which is keyed upon shaft B, and engages with friction-rollers $f$ and $f'$ upon the rods, as will appear more clearly by reference to Fig. 9 of the drawings.

Steam is fed to the engine from a suitably-located boiler through a port, $i$, which opens into the cylindrical valve-chest J, in which the rotary reciprocating valve K works. The latter is operated by a handle, $k$, and has a bifurcated steam-channel, $l$ $l'$, and exhaust-channels $m$ $m'$.

$m^2$ and $m^3$ are the exhaust-ports in chest J, and $n$ $n'$ the steam-ports. A bifurcated pipe, L L', leads from port $n$ to the cylinder valve-chests N N', and another bifurcated pipe (shown at M M') leads from port $n'$ to chests N and N'.
Pipes L L' and M M' are so arranged that their respective branches L and M feed into the steam-chest N, one above the other, while branches L' and M' feed in like manner into the opposite steam-chest, N'. Within chests N and N' are placed the rotary reciprocating valves O and O', the ports $o$ $p$ and $o'$ $p'$ of which are so arranged relative to the steam or induction pipes and the steam-ports $q$ $q'$ and $r$ $r'$ in the steam-cylinder that when live steam is fed through the branched pipe L L' it will enter the steam-chests N and N' through their ports $s$ and $s'$, and through the valve-ports $o$ and $o'$ and cylinder-ports $q$ $q'$ the steam will enter the cylinder on diagonally-opposite sides of the cut-offs D and D'. When in this position of the valves and cut-offs the exhaust passes through ports $r$ $r'$, valve-ports $p$ $p'$, and chest-ports leading into the forked pipe M M', and through it into the cylindrical valve-chamber J, (by way of its port $n'$,) and out through the valve-channel $m$ and its corresponding exhaust-port, $m^2$.

To reverse the motion of the engine, valve K is turned so that live steam will enter through branch $l$ of its channel and the port $n'$ into the branched pipe M M', and through it and steam-chests N and N', and through the valve-ports $p$ and $p'$ into the cylinder through its ports $r$ and $r'$. The exhaust now passes through ports $q\ q'$, $o\ o'$, and $s\ s'$, by way of branch pipe L L', into valve-chamber J, from which it escapes through channel $m'$ and its appropriate port $m^3$.

To stop the engine, the handle of valve K is turned in a line with the drive-shaft B, (pointing from the cylinder,) when steam is shut off from the valve-chamber J, as shown in Fig. 2. The rotary reciprocating valves O and O' are operated by a slide, P, which is worked by a cam, P', forming part of it, and a disk, Q, having rollers $u\ u$, which engage with the cam. Disk Q is keyed upon the inner end of shaft B, which projects out through a T-shaped slot in the face-plate of cam P'. The slide is held in place upon the steam-chests N and N' by flat disks or buttons R R, and is slotted or recessed at its ends to engage with the arms $w$ of the rotary reciprocating valves O and O'.

S is the drive-wheel, which is fastened upon the outer end of the drive-shaft B.

Having thus described my invention, I claim and desire to secure by Letters Patent of the United States—

1. In a rotary steam-engine, the combination of the valve-chamber I, having inlet $i$, escape-ports $m^2\ m^3$, and steam-ports $n\ n'$, connecting with the bifurcated steam-pipes L L' and M M', and valve K, having handle $k$, and provided with the bifurcated steam-channel $l\ l'$ and channels or recesses $m\ m'$, substantially as and for the purpose herein shown and set forth.

2. The combination of the bifurcated steam-pipes L L' and M M', steam-chests N N', having ports $s\ s'$ and $t\ t'$, rotary reciprocating valves O O', having ports $o\ p$ and $o'\ p'$, cylinder A, having ports $q\ q'$ and $r\ r'$, and provided with the piston C, cut-offs D and D', and means for operating the valves O O' and cut-offs D D', all combined and arranged to operate substantially in the manner and for the purpose herein shown and described.

In testimony that I claim the foregoing as my own I have hereunto affixed my signature in presence of two witnesses.

PEHR LARSSON.

Witnesses:
  P. J. LAYNE,
  OLE JOHNSON.